(12) United States Patent
Kilgore et al.

(10) Patent No.: US 7,366,653 B2
(45) Date of Patent: Apr. 29, 2008

(54) METHODS AND APPARATUSES FOR STRING TRANSLATION

(75) Inventors: William B. Kilgore, Tempe, AZ (US); Peter Thorson, San Mateo, CA (US); David de la Torre, Alameda, CA (US); Gopalakrishnan Kandalurajaram, Phoenix, AZ (US); Lyle Decker, Tempe, AZ (US); Chi Vong, Chandler, AZ (US); Shu Lei, Belmont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 803 days.

(21) Appl. No.: 10/745,369

(22) Filed: Dec. 22, 2003

(65) Prior Publication Data

US 2007/0239588 A1    Oct. 11, 2007

(51) Int. Cl.
*G06F 17/28* (2006.01)

(52) U.S. Cl. .................... 704/2; 704/8; 704/5; 717/124

(58) Field of Classification Search .................... 704/8, 704/2, 5, 270, 277, 9, 1, 257; 717/124
See application file for complete search history.

(56) References Cited

U.S. PATENT DOCUMENTS

| | | | |
|---|---|---|---|
| 6,931,628 B2* | 8/2005 | McGeorge, Jr. | 717/124 |
| 7,024,365 B1* | 4/2006 | Koff et al. | 704/270.1 |

* cited by examiner

*Primary Examiner*—Huyen X. Vo
(74) *Attorney, Agent, or Firm*—Campbell Stephenson LLP

(57) ABSTRACT

Embodiments of the invention provide systems and methods for translating application strings between entities using a semantical (definition-based) translation scheme. Embodiments of the invention provide the ability to design and create an application user interface that can be reliably and efficiently localized. For one embodiment, each string is semantically defined and the definition is used to determine a corresponding display value for each entity (e.g., human language) of interest. Additionally, for one embodiment, a sparse-matrix data structure is employed to reduce the associated metadata.

15 Claims, 2 Drawing Sheets

US 7,366,653 B2

METHODS AND APPARATUSES FOR STRING TRANSLATION

FIELD

Embodiments of the invention relate generally to the field of software applications and, more specifically, to the translation of strings within such applications.

BACKGROUND

The growing trend toward multinational organizations has given rise to a corresponding need for fast, efficient, and accurate internationalization and localization of software applications. The need for localization may arise in many contexts, but typically the requirement for localization is as follows. A software application is created in a given human language and dialect. It may be desirable to market and use the application in several other languages. In such a case, it is not practical in terms of costs and resources to rewrite the application in each of the desired languages. It is, however, desirable to translate the labels and menus of the application user interface (UI) to a target language without modifying the application code.

Typical internationalization and localization schemes associate a visual display with each UI string through use of a catalog-type mechanism. For example, a given string may have a visual representation in English of "NAME" and may be used to elicit the name of a user of the application. During internationalization, the string is translated to "NOM" for a French-language application, "NOMBRE" for a Spanish-language application, and so on. Therefore, there is a one-to-one mapping of the visual representation of each string from one language to another. This allows the strings to be separated from the application code. Some current schemes take account of the fact that a given language may be different depending upon the country in which it is spoken (e.g., American-English vs. Australian-English), or even between regions of a particular country (Northeastern United States vs. Southern United States). Such schemes translate strings based upon "locale", which is the consideration of the particular language, country, and region. Locale is the finest granularity to which current schemes aspire, but it is often not sufficient when a visual representation in a particular language is amenable to multiple and disparate meanings. That is, ambiguities can result during the translation because current schemes reference a given string based solely on its display value. For example, the term "ACCOUNT" in English may be used to indicate a customer in some applications (e.g., sales industry) and may be used to indicate a monetary value storage entity for other applications (e.g., financial services industry). Therefore, when ACCOUNT appears in an English-language application, the translator has no way of knowing which French word, for example, to translate it to. The string corresponding to ACCOUNT in an English-language application could be translated into the French word meaning customer, or the French word meaning monetary value storage entity, which may have different visual representations. Current internationalization schemes ignore these industry-context discrepancies, thus, fostering ambiguity and error.

Moreover, current internationalization schemes do not provide the ability to translate portions of a given string in different ways to reflect different meanings from one industry to another.

Another disadvantage of internationalization schemes that are based upon the display value of the strings is the inability to provide reliable reuse of translations across different applications or even throughout a given application. For example, an English-language application may employ distinct strings having visual representations that are homonyms (i.e., the visual representations are the same). During translation, each string should be translated to a different visual representation for a given locale. Because current internationalization schemes identify strings by their corresponding visual display value, the context of each instance of the string must be examined to determine the correct translation. This means that reuse of translations for a given visual display value cannot be relied upon.

Therefore, current internationalization schemes exhibit serious disadvantages in terms of both accuracy and efficiency when it comes to strings used in multiple contexts or strings having different meanings across industries.

SUMMARY

Embodiments of the invention provide a method for providing a visual display value for a particular string value. A string value is associated with a corresponding definition and a visual display value is determined for the string value based upon the corresponding definition.

Other features and advantages of embodiments of the present invention will be apparent from the accompanying drawings, and from the detailed description, that follows below.

DESCRIPTION OF THE DRAWINGS

The invention may be best understood by referring to the following description and accompanying drawings that are used to illustrate embodiments of the invention. In the drawings.

DETAILED DESCRIPTION

Embodiments of the invention provide systems and methods for translating application strings between entities using a semantical (definition-based) translation scheme. Embodiments of the invention provide the ability to design and create a UI that can be reliably and efficiently localized. For one embodiment, each string is semantically defined and the definition is used to determine a corresponding display value for each entity (e.g., human language) of interest. Additionally, for one embodiment, a sparse-matrix data structure is employed to reduce the associated metadata.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Semantic Mapping

Figure 1:
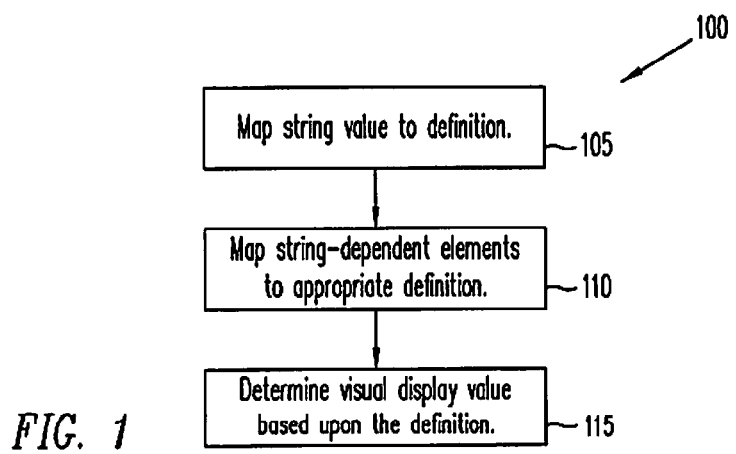
FIG. 1 illustrates a process by which a multi-tiered map is created and used in accordance with one embodiment of the invention.
Figure 2:
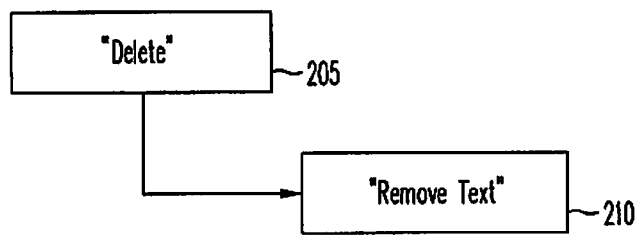
FIG. 2 illustrates the mapping of a string value to a definition in accordance with one embodiment of the invention.

For one embodiment, the invention provides a scheme for storing strings, based upon their definitions and referenced by their various visual display values, and creating an association with the string-dependent elements of the UI for displaying the corresponding visual display values. In accordance with one embodiment, a multi-tiered mapping process is employed to associate each literal string value with a semantic string value (definition) and link each semantic string value to a corresponding visual display value for a particular entity. FIG. 1 illustrates a process by which a multi-tiered map is created and used in accordance with one embodiment of the invention. Process 100, shown in FIG. 1, begins at operation 105 in which a string value is mapped to (associated with) a definition. FIG. 2 illustrates the mapping of a string value to a definition in accordance with one embodiment of the invention. As shown in FIG. 2, string value 205 represents the concept "DELETE" and is mapped to a definition 210 of "REMOVE TEXT".

Referring again to FIG. 1, at operation 110, each string-dependent element of the UI (e.g., a menu item, icon, button, etc.) is mapped to the appropriate definition.

Figure 3:
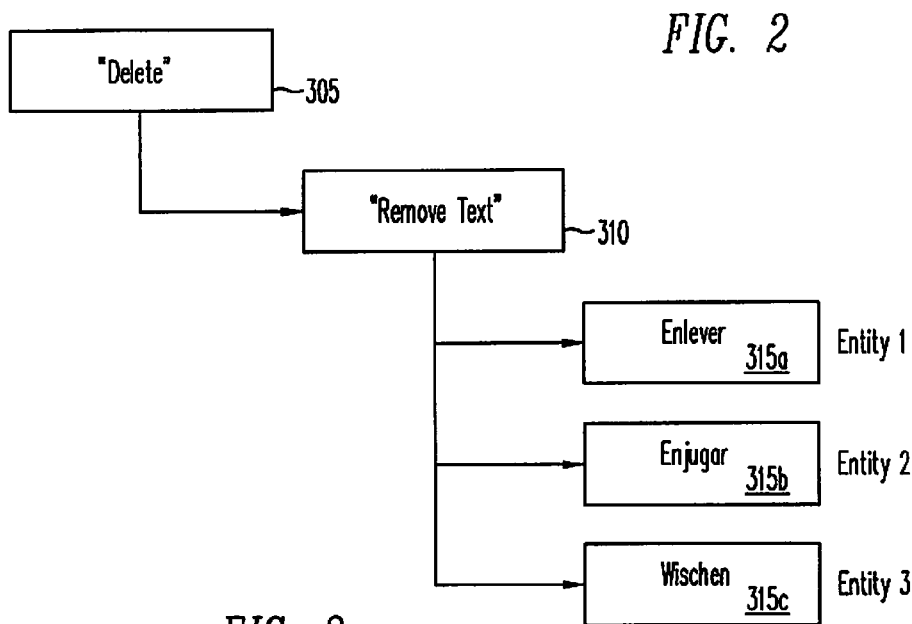
FIG. 3 illustrates the determination of visual display values for particular entities based upon the definition corresponding to the string in accordance with one embodiment of the invention.

At operation 115, the visual display value for a particular entity is determined based upon the definition. The definition is used to associate the concept represented by the corresponding string with an appropriate visual display value for each particular entity (e.g., locale). That is, the application is created having a number of string-dependent elements each associated with a definition with each definition having a corresponding string. The translator uses the definition and corresponding string to determine a visual display value for each of a number of entities. FIG. 3 illustrates the determination of visual display values for particular entities based upon the definition corresponding to the string in accordance with one embodiment of the invention. As shown in FIG. 3, the string 305 is mapped to a definition 310. The definition is then used as a basis for determining a visual display value. The visual display values 315a-315c are determined for Entity 1, Entity 2 and Entity 3, respectively. Thus, the translation of the string for each entity is not based upon the display value for that string for a particular entity (syntactical), but is based upon the definition associated with the string (semantical). This provides greater accuracy in translation as the translator is not guessing as to the meaning and context of visual display values of the source entity, but has the associated definition on which to base the determination of an appropriate visual display value for the target entity.

The semantic mapping process of FIG. 1 is carried out for each definition and each entity of interest, thus creating a multi-tiered semantic translation map or dictionary of available translated terms.

Increased Granularity

Figure 4:
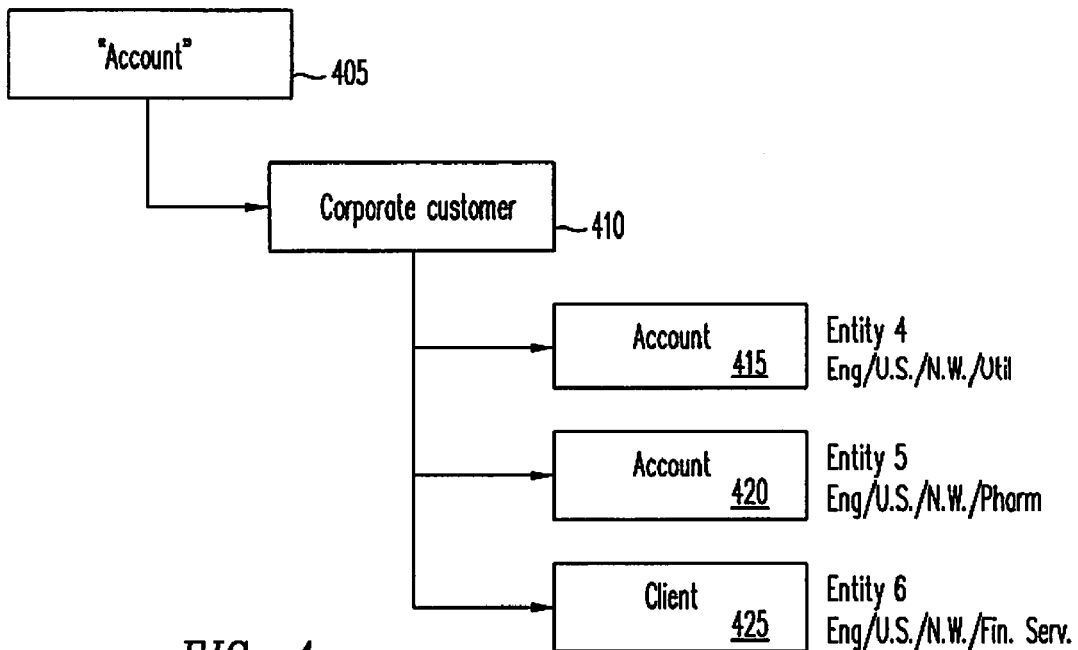
FIG. 4 illustrates the use of increased granularity to avoid industry context-based translation errors in accordance with one embodiment of the invention.

Typical prior art translation schemes are based upon locale, taking into account the language, country, and region. Embodiments of the invention recognize that translation errors often occur due to the fact that a given locale may overload particular strings with multiple meanings that vary with industry context. For one embodiment of the invention, the granularity of the translation scheme is increased through the consideration of industry context in conjunction with locale. FIG. 4 illustrates the use of increased granularity to avoid industry context-based translation errors in accordance with one embodiment of the invention. As shown in FIG. 4, string 405 "ACCOUNT" is mapped to definition 410 "CORPORATE CUSTOMER." The term account has several possible, disparate meanings in English, depending upon the industry context. Therefore, in accordance with one embodiment of the invention, the definition 410 is associated with a visual display value 415 of "ACCOUNT" for entity 4, which is based upon a given locale and a given industry, namely the utility industry. Likewise, the definition 410 is associated with a visual display value 420 of "ACCOUNT" for entity 5, which is based upon a given locale and a given industry, namely the pharmaceutical industry. However, for entity 6, based upon the same given locale, but with an industry, namely financial services, that defines account differently, the definition 410 is associated with a display value 425 of "CLIENT" rather than "ACCOUNT."

In accordance with one embodiment of the invention, there is no longer the restriction of a one-to-one mapping between a visual display value and a given locale. Embodiments of the invention provide a one-to-N mapping based upon, for example, industry context, where N is the number of industries. By basing translation on a semantical, rather than syntactical mapping, words having multiple meanings for various contexts (industry or otherwise) can be translated accurately and efficiently.

Basing the determination of the visual display value on, for example, industry context as well locale provides increased granularity, but may require the storage of a prohibitive amount of metadata. That is, words with multiple meanings across industries (or between other entities) are exceptions. It is problematic in terms of accuracy to ignore such exceptions, but creating a multitude of mapping entries with redundant representations is costly and also prone to error. In accordance with one embodiment of the invention, the mapping is stored as a sparse matrix (a matrix having relatively few non-zero entries) to reduce storage requirements.

Translation

Figure 5:
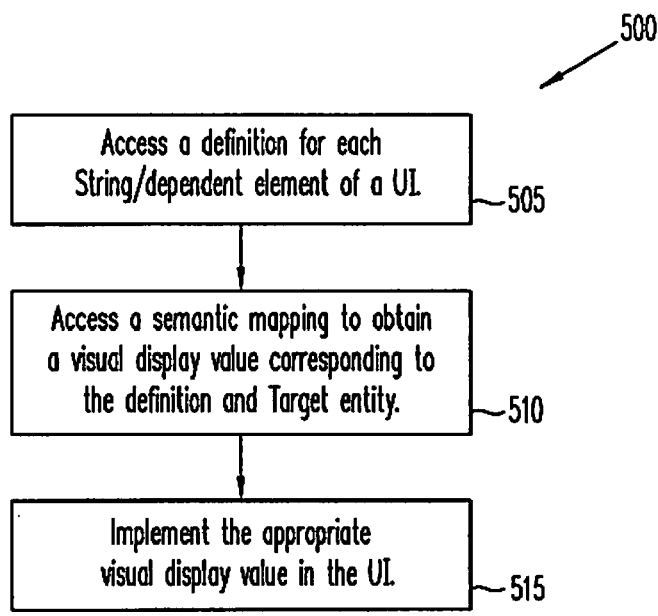
FIG. 5 illustrates a process by which a multi-tiered semantic translation map is used to translate strings between entities in accordance with one embodiment of the invention.

Once the translation map is completed (with or without increased granularity), the map can be used to effect efficient and reliable translation of strings for all target entities. That is, embodiments of the invention allow each defined and translated string to be reused indefinitely through the UI. If the string has been translated to other entities (e.g., languages), the string and its translations can be reused by setting a pointer to the string from the appropriate string-dependent elements. FIG. 5 illustrates a process by which a multi-tiered semantic translation map is used to translate strings between entities in accordance with one embodiment of the invention. Process 500, shown in FIG. 5, begins at operation 505 in which a UI translator accesses a definition for each string-dependent UI for a particular entity. The translator no longer relies upon the visual display value of the source entity for reference.

At operation 510, the translator accesses the semantic mapping to obtain the visual display value corresponding to the definition and the target entity. Once the semantic mapping is completed, it can be reused for translation to every entity to which the semantic mapping applies. That is, in accordance with one embodiment, when the UI is configured for a particular entity, references to each string are set allowing configuration of the UI for all other mapped entities. The semantic representation of the strings in accordance with various embodiments, eliminates the syntactical representation-based difficulties, such as the occurrence of homonyms in some languages, which inhibited translation reuse in prior art schemes.

At operation 515, the appropriate visual display value is implemented in the UI.

General Matters

Embodiments of the invention provide systems and methods for translating application strings between entities using a translation scheme that semantically defines each string and uses the definition to determine a corresponding display value for each entity. Embodiments of the invention allow a string, as referenced by its definition, to be used as necessary, throughout the UI. Moreover, for a string that has been translated for use by various entities, both the string and its translations can be readily reused by setting a pointer from the string-dependent element to the associated string definition.

Embodiments of the invention have been described in terms of translation from one human language, locale, or industry, to another. However, it will be clear to one skilled in the art that embodiments of the invention extend to translation between a number of various entities including, for example, organizations, manufacturers, governing bodies, professions, individuals, and combinations thereof.

Embodiments of the invention may be used to provide universal configuration of a UI by selecting strings from a set of pre-defined and pre-translated strings, and to standardize terminology by restricting application developers to a pre-defined set of strings that can be used in the UI.

Embodiments of the invention also provide many additional advantages over prior art schemes. Such advantages include but are not limited to (i) reliable and efficient translation; (ii) reduced metadata storage requirements; and (iii) selective string editing.

Embodiments of the invention include various operations. Many of the methods are described in their most basic form, but operations can be added to or deleted from any of the methods without departing from the basic scope of the invention.

It will be apparent to those skilled in the art that the operations of embodiments of the invention may be stored upon or embodied in machine-executable instructions, which may be used to cause a general-purpose or special-purpose processor or logic circuits programmed with the instructions to perform specific operations.

Alternatively, the operations of embodiments of the invention may be performed by a combination of hardware and software. Embodiments of the invention may be provided as a computer program product that may include a machine-readable medium having stored thereon instructions, which may be used to program a computer (or other electronic devices) to perform a process according to various embodiments of the invention.

Such machine-readable medium may include, but are not limited to, floppy diskettes, optical disks, CD-ROMs, and magneto-optical disks, ROMs, RAMs, EPROMs, EEPROMs, magnet or optical cards, flash memory. Moreover, the invention may also be downloaded as a computer program product, wherein the program may be transferred from a remote processor to a requesting processor by way of data signals embodied in a carrier wave or other propagation medium via a communication cell (e.g., a modem or network connection). The present invention also relates to an apparatus for performing the operations herein. This apparatus may be specially constructed for the required purposes, or it may comprise a general-purpose processing system selectively activated or reconfigured by an application program stored within the processing system. Such an application program may be stored in a machine-readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, and each coupled to a computer system bus.

The processes described herein are not inherently related to any particular system or other apparatus. Various general-purpose systems may be used with programs in accordance with the teachings herein, or it may prove convenient to construct a more specialized apparatus to perform the described operations.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   associating a literal string value to a corresponding predetermined context-specific semantic definition thereof;
   determining an entity-specific visual display value using the predetermined context-specific semantic definition for each of a plurality of entities;
   generating a translation map for the literal string value by linking said predetermined definition to a plurality of the entity-specific visual display values, wherein each visual display value is associated with a corresponding different entity from a plurality of entities;
   translating said literal string value for a first entity from said plurality of entities by selecting one of said plurality of visual display values associated with said first entity as a translation of said literal string value for said first entity; and
   displaying the selected visual display value.

2. The method of claim 1, wherein the literal string value, the corresponding context-specific definition, and the plurality of visual display values are stored as a sparse matrix.

3. The method of claim 1, wherein an entity is selected from the group consisting of locale, industry, professions, governing bodies, organizations, individuals, and combinations thereof.

4. The method of claim 1, further comprising:
   identifying one or more string-dependent elements of an application user interface;
   determining an entity-specific visual display value for each of said one or more string-dependent elements using a translation map corresponding to each literal string value associated with respective string-dependent element; and displaying the visual display value corresponding to each string-dependent element for a desired entity.

5. The method of claim 4 further comprising:

implementing the determined visual display value for each string-dependent element of the application user interface.

6. A computer-implemented application development tool comprising:

means for associating each of a plurality of literal string values to a corresponding predetermined context-specific semantic definition thereof;

means for determining an entity-specific visual display value using the predetermined context-specific semantic definition for each of a plurality of entities;

means for generating a translation map for each literal string value by linking said predetermined definition to a respective plurality of entity-specific visual display values, wherein each said visual display value is associated with a corresponding different entity from a plurality of entities;

means for associating each of one or more string dependent elements of an application user interface with a corresponding literal string value from said plurality of literal string values; and means for determining an entity-specific visual display value for each of said one or more string-dependent elements for a desired entity based upon the translation map corresponding to each literal string value associated with respective string-dependent element; and means for displaying the visual display value.

7. The computer-implemented application development tool of claim 6, wherein the literal string values, corresponding context-specific semantic definitions, and corresponding plurality of visual display values are stored as a sparse matrix.

8. The computer-implemented application development tool of claim 6, wherein an entity is selected from the group consisting of locale, industry, professions, governing bodies, organizations, individuals, and combinations thereof.

9. The computer-implemented application development tool of claim 6, further comprising:

means implementing the determined visual display value for each string-dependent element of the application user interface.

10. A machine-readable medium having stored thereon executable instructions which when executed by a processor cause said processor to perform a method comprising:

associating a literal string value to a corresponding predetermined context-specific semantic definition thereof;

determining an entity-specific visual display value using the predetermined context-specific semantic definition for each of a plurality of entities;

generating a translation map for the literal string value by linking said predetermined definition to a plurality of entity-specific visual display values, wherein each visual display value is associated with a corresponding different entity from a plurality of entities;

translating said literal string value for a first entity from said plurality of entities by selecting one of said plurality of visual display values associated with said first entity as a translation of said literal string value for said first entity; and displaying the selected visual display value.

11. The machine-readable medium of claim 10, wherein said executable instructions upon being executed by said processor further cause said processor to store the literal string value, the corresponding context-specific definition, and the plurality of visual display values as a sparse matrix.

12. The machine-readable medium of claim 10, wherein an entity is selected from the group consisting of locale, industry, professions, governing bodies, organizations, individuals, and combinations thereof.

13. The machine-readable medium of claim 10, wherein the method further comprises:

identifying one or more string-dependent elements of an application user interface;

determining an entity-specific visual display value for each of said one or more string-dependent elements using a translation map corresponding to each literal string value associated with respective string-dependent element; and displaying the visual display value corresponding to each string-dependent element for a desired entity.

14. The machine-readable medium of claim 13 wherein the method further comprises:

implementing the determined visual display value for each string-dependent element of the application user interface.

15. A method comprising:

associating a character string to be translated to a corresponding predetermined context-specific semantic definition thereof;

determining an entity-specific visual display value using the predetermined context-specific semantic definition for each of a plurality of entities;

providing a one-to-N mapping between said predetermined definition and a plurality of entity-specific visual display values, wherein each visual display value is associated with a corresponding different entity from a set of N entities;

translating said character string for a first entity from said set of N entities by selecting one of said plurality of visual display values corresponding to said first entity as a translation of said character string for said first entity; and displaying the selected visual display value instead of said character string to a user.

* * * * *